United States Patent [19]

Wagner

[11] Patent Number: 5,105,664
[45] Date of Patent: Apr. 21, 1992

[54] GLASS OILER AND PLASTIC SUMP JUG SHIELDS

[76] Inventor: Allen S. Wagner, 2736 Bliss Ct., Antioch, Calif. 94509

[21] Appl. No.: 680,382

[22] Filed: Apr. 4, 1991

[51] Int. Cl.⁵ ............................................. G01F 23/02
[52] U.S. Cl. ................................... 73/325; 73/323
[58] Field of Search ........................... 73/323-326; 184/96, 97

[56] References Cited

U.S. PATENT DOCUMENTS

| | | | |
|---|---|---|---|
| 409,280 | 8/1889 | Engels | 73/326 |
| 776,331 | 11/1904 | Kerwick et al. | 73/325 |
| 1,206,740 | 11/1916 | Thaxton . | |
| 1,273,103 | 7/1918 | Sanders . | |
| 1,629,348 | 5/1927 | Ludwin et al. . | |

Primary Examiner—William A. Cuchlinski, Jr.
Assistant Examiner—W. Morris Worth
Attorney, Agent, or Firm—Myers & Associates

[57] ABSTRACT

The present invention of an opaque dirt shield for covering transparent portions of a sight container includes an obverse cover, a reverse cover, a fastener and viewing flaps. The covers are generally conformal with the shape of the container. The covers may be made integral into a planar mode to be shaped about the container by a user. The fastener secures one portion of a cover or associated structure to a related portion to position and secure the components of the shield with respect to each other and secure the shield onto the container. The viewing flaps allow the visual inspection of the interior of the container. Similarly, illumination flaps allow the illumination of the interior of the container.

19 Claims, 3 Drawing Sheets

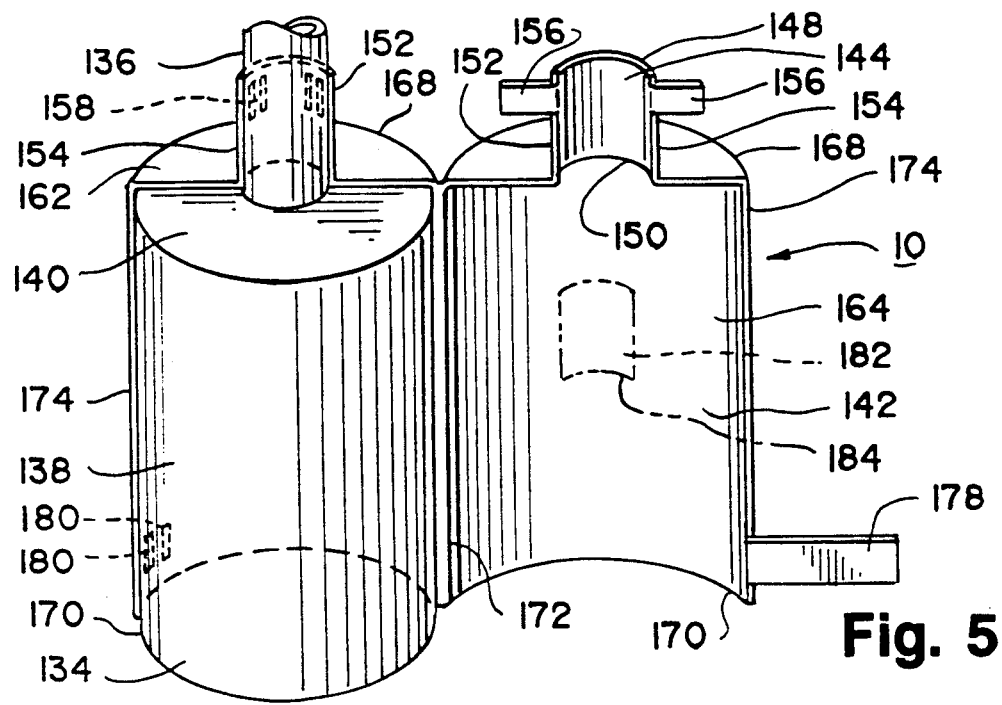
Fig. 5
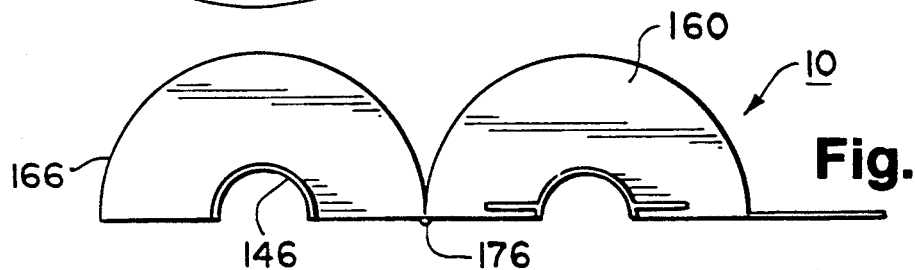
Fig. 6
Fig. 7
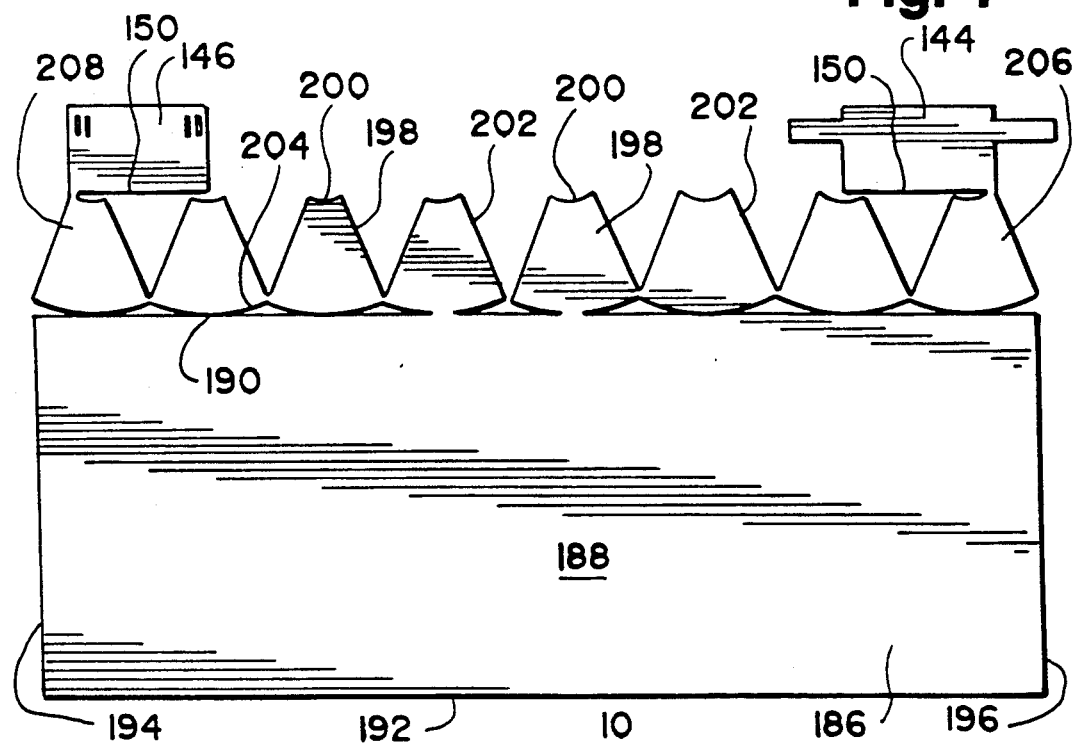

GLASS OILER AND PLASTIC SUMP JUG SHIELDS

BACKGROUND OF THE INVENTION

This invention relates to covers to prevent surfaces from being contaminated. The invention particularly relates to shields for sight containers such as glass oilers or sump jugs.

Glass oilers and the like store and supply oil to portions of machinery requiring lubrication and provide a visual indication of the oil condition. Sump bottles or jugs in contrast are connected to a sump or reservoir of oil to provide a visual indication of the oil condition. These sight containers are periodically inspected to determine whether or not the oil is contaminated or changed in condition by a malfunction. Either may ultimately cause machine failure.

Sight containers are often found in industrial settings which include a plethora of contaminants. Perhaps the more severe duty is in atmospheres where free caustic or corrosive vapors are present in the air. These vapors can over a period of time clog or even etch the glass or transparent portions of the sight containers and necessitate their replacement in relatively short periods of time. At present, the machinery attendees periodically attempt to maintain the cleanliness of the sight container surfaces as often as once a week. Despite frequent cleaning, the transparent portion of the sight container must be replaced in as little time as a year in some operations.

A variety of doors or covers for gauges appears in the patent literature to include the following.

U.S. Pat. No. 1,629,328 to Ludwin, et al. for a GAUGEGLASS AND FEED GLASS PROTECTION describes a transparent cover for sight gauges, the purpose of which is to contain broken glass should the gauge shatter.

U.S. Pat. No. 1,273,103 to Sanders for a LIQUID MEASURING TANK discloses a pair of doors 16, operated by a worm gear, which covers the sight gage.

U.S. Pat. No. 1,206,740 to Thaxton describes a MEASURING PUMP ATTACHMENT including gauge doors 25.

BRIEF DESCRIPTION OF THE DRAWING

FIG. 5 is a perspective view of the shield of the present invention protecting a sump jug.

FIG. 6 is a top view of the shield of FIG. 5.

FIG. 7 is a second embodiment of a homolographic shield of the present invention.

DETAILED DESCRIPTION OF THE DRAWING

Figure 1:
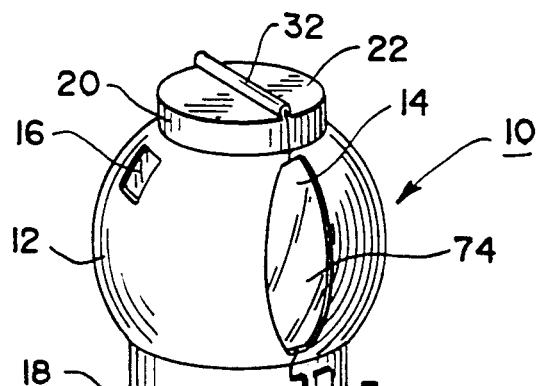
FIG. 1 is a perspective view of the shield of the present invention protecting a glass oiler.

Dirt shield 10 of the present invention is shown in each figure of the drawing.

FIG. 1 is a perspective view of one embodiment of a spherical dirt shield 12, adapted to fit about and cover a somewhat spherical glass oiler 14. Glass oiler 14 includes a transparent generally spherical side portion 16 between a cylindrical top portion and a cylindrical bottom 18. Dirt shield 12 includes a first top cover piece 20 and a second top cover piece 22, which are adapted to fit about the cylindrical top of glass oiler 14. Each top cover piece has a top 24, bottom 26, first side 28 and second side 30 edges. First top cover piece 20 is joined to second top cover piece 22 by joiner hinge 32. When shield 12 is formed about oiler 14 joiner hinge 32 basically appears as a ridge between the tops 24 of first 20 and second 22 top covers. A semi-spherical obverse side cover 34 is joined to the bottom edge 26 of the first top cover piece 20. Obverse side cover 34 includes top 36, bottom 38, and first side 40 and second side 42 edges. Reverse side cover 44 is joined to the bottom 26 of the second top cover piece 22 in a similar fashion. Reverse cover 44 is also semi-spherical and includes top 36, bottom 38, first side 40 and second side 42 edges. First bottom cover piece 46 is joined to bottom edge 38 of obverse side cover 34. Similarly second bottom cover piece 48 extends downward from bottom edge 38 of reverse side cover 44. Bottom cover pieces 46, 44 are similar to first 20 and second 22 top cover pieces in that they are intended to and adapted to fit about a cylindrical portion of sight container 14. Bottom cover pieces 46, 48 each have top 50, bottom 52, and first side 54 and second side 56 edges. Bottom tab 58 extends from second side edge 56 of first bottom cover piece 46 to distal tab end 60. The tab length of course is defined by the distance between first edge 56 and tab distal end 60. Similarly, tab top 62 and tab bottom 64 define the tab width. First bottom slot 66 and second bottom slot 68 is defined in the second bottom cover piece 48 for receiving bottom tab 60. First bottom slot 66 and second bottom slot 68 are inset to the interior of second cover piece 48 for a distance less than the tab length. Slots 66, 68 have slot widths which are somewhat greater than the tab width, so that tab 60 may be easily received within the bottom slots 66 and 68. A second tab 60A is symmetrically located on second bottom cover piece 48 to engage slots 66A and 68A on first bottom cover piece 46. At least one viewing flap 70 is defined in one of the side covers 34, 44 by perforations 72. At the selection of an operator, viewing flap 70 can be partially detached from the side cover by leaving one of the rectangular sides defined by perforations 72 attached to the side cover to act as a hinge. Alternately, the operator may totally detach viewing flap 70. In addition to viewing flap 70, which allows an operator to view the interior of shield 12 and glass oiler 14, it is desirable that some sort of illumination means for allowing the illumination of the interior of shield 12 and sight container 14 be provided. Of course, a viewing flap 70 of one cover 34 and 44 can so be used. Alternately, a space 74 could be left between first 40 or second 42 edges of obverse cover 34 and reverse cover 44 to serve as viewing means. To a large extent, the purpose of viewing flap 70 and space 74 are similar as allowing optical accesses to the interior of shield 12 and oiler 14 are therefore largely interchangeable.

It is desirable that shield 12 be freely rotatable on sight container 14. The viewing means and the illumination means of rotatable shield 12 may be incrementally rotated to an unobscured portion of transparent side 16 as a portion of transparent side 16 becomes obscured by contaminants. This extends the lifetime of oiler 14. Similarly, the lifetime of oiler 14 may be extended by leaving viewing flap 70 partially attached to side shields and closing it after inspection.

Shield 10 can be fabricated from a variety of materials. However, the envisioned preferred material is deformable aluminum foil of a type used in pie plates.

Figure 4:
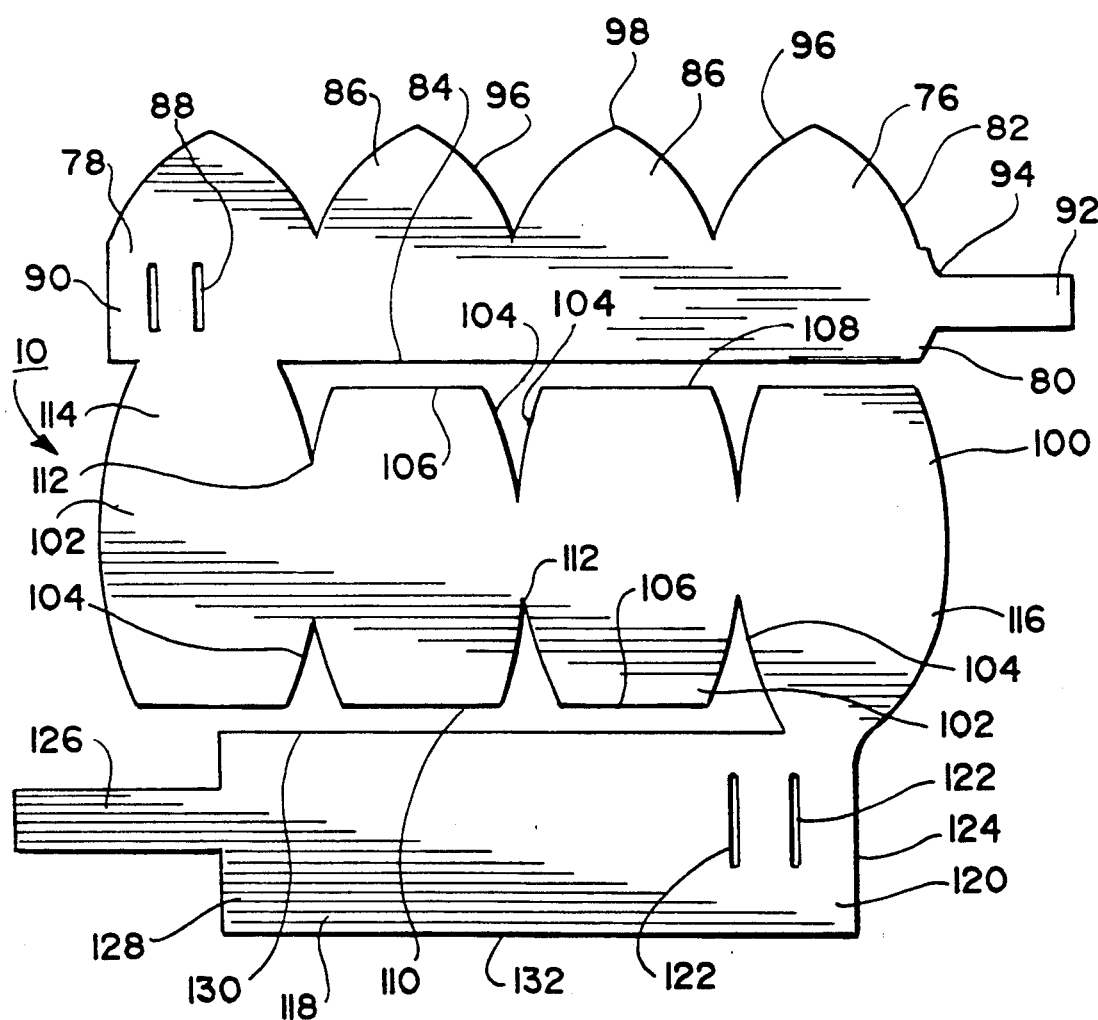
FIG. 4 is an embodiment of a homolographic shield of the present invention.

Another embodiment of shield 10 for protecting an oiler 14 is shown in FIG. 4, as opaque shield 76. Shield 76 includes top cover 78. Top cover 78 has a top cylindrical band 80 having an upper 82 and lower 84 edge, with a parallelity of wedges 86 joined to upper edge 82. Top cylindrical band 80 includes at least one slot 88 adjacent slot longitudinal end 90 and a tab 92 adjacent to an opposite tab longitudinal end 94. The tab 90 is received in the slot 88 to fasten cylindrical band 80 about the top cylindrical side surface of oiler 14. The wedges extending from the upper edge 82 of the top cylindrical band include two angled side edges 96 meeting in an apex 98. The two angled side edges 96 may be straight or slightly arcuate to provide a degree of overlap as shown. The wedges 86 substantially cover the cylindrical top surface of oiler 14 after cylindrical band 80 is wrapped about the top cylindrical side surface and the wedges 86 are displaced into a plane intersecting band 80 at an angle of about ninety degrees. Before being fitted about the top cylindrical side surface of oiler 14, shield 76 is substantially planar. Dirt shield 76 further includes a homolographic side cover 100 including a plurality of double wedges 102. Each double wedge 102 has arcuate sides 104 terminating at truncated apexes 106 at upper 108 and lower 110 double wedge ends. Each double wedge 102 is joined to an adjacent double wedge 102 near the joinder 112 of adjacent double wedge sides 104. An upper double wedge 114, one of the plurality of double wedges 102, is joined to top cylindrical band 80. Similarly, a lower double side wedge 116 is joined to a bottom cover 118.

Bottom cover 118 is principally bottom cylindrical band 120 which is similar to top cylindrical band 80. Bottom cylindrical band 120 has features similar to band 80 symmetrically located with respect to the center lines of the top cylindrical band 80 and bottom cylindrical band 120. Bottom cylindrical band 120 includes slots 122 adjacent to a slot longitudinal end 124 and a tab 126 adjacent to a tab longitudinal end 128. Bottom cylindrical band 120 is defined at the upper and lower margins by upper edge 130 and lower edge 132. Slots 122 are adapted to receive tab 126 in a manner similar to the analogous structure of top cover 78. Viewing means for visually inspecting the interior of the shields and the container can be provided by structure similar to viewing flap 70 or enlarging the distance between angle side edges 96 of adjacent wedges 86.

Figure 2:
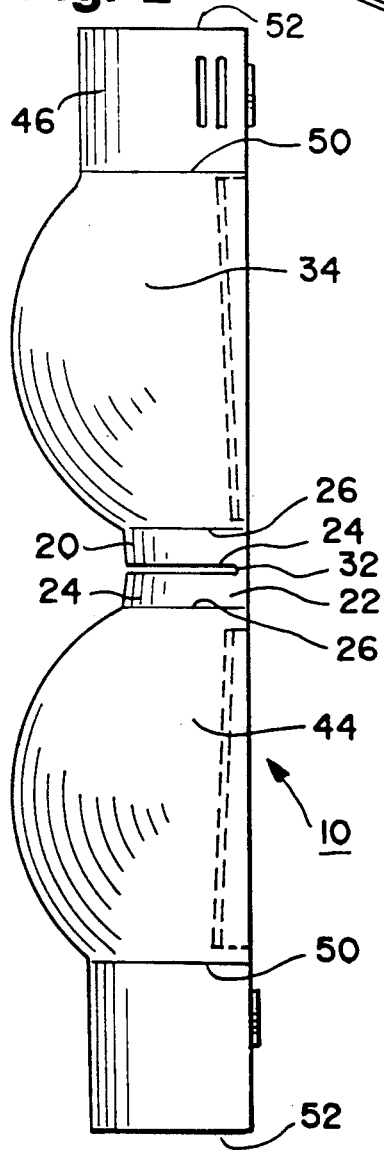
FIG. 2 is a side elevation of the shield of the present invention.
Figure 3:
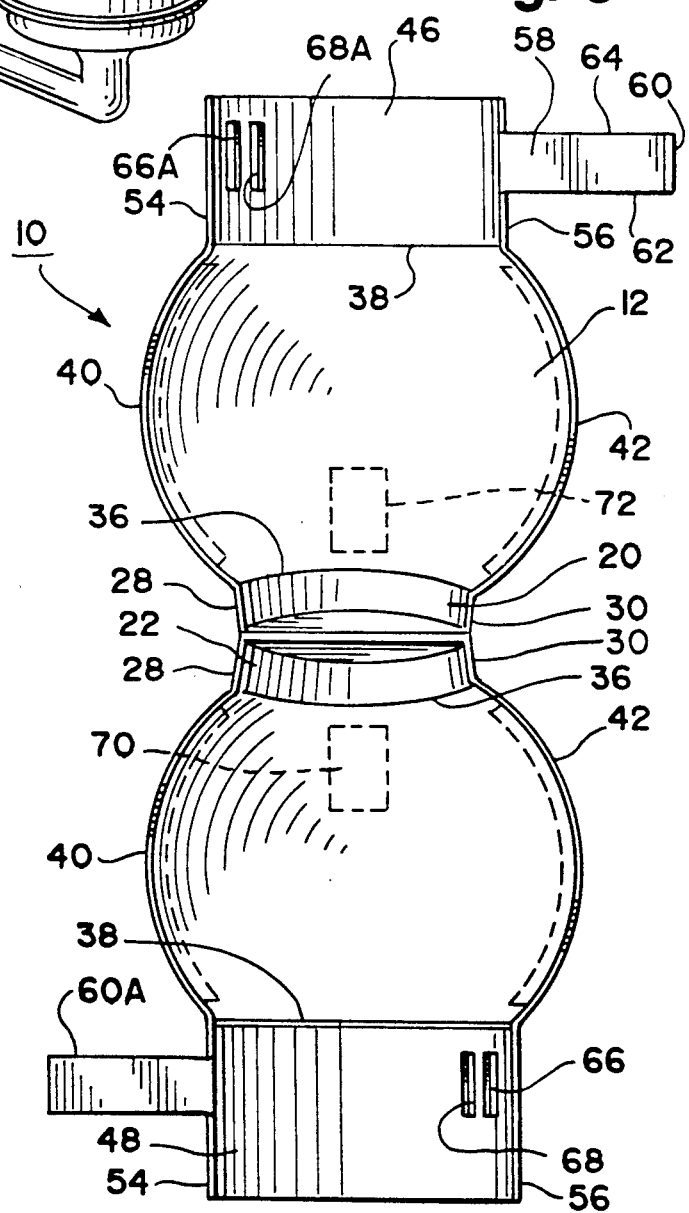
FIG. 3 is an exterior view of the shield of the present invention.

FIGS. 5 through 7 of the drawing show two additional embodiments of shield 10 adapted to protect cylindrical sump jug 134. Sump jug 134 is connected via input pipe 136 to a reservoir (not shown). Sump jug 134 includes a generally cylindrical body with generally transparent arcuate side 138 which depend from a generally circular top 140. Dirt shield 142 shown in FIGS. 5 and 6 of the drawing is somewhat similar to dirt shield 10 shown in FIGS. 2 and 3 of the drawing since they are non planar structures adapted to fit about the respective containers 14 and 134. Shield 142 includes a first pipe cover piece 144 and a second pipe cover piece 146 each of which are semicylindrical and adapted to fit about input pipe 136. Each pipe cover piece 144 and 146 includes top 148, bottom 150, and first 152 and second 154 side edges. Pipe tabs 156 extend the normal margins of the side edges 152 and 154 for a predetermined tab length along a predetermined tab width along one of the edges 152 and 154. Second pipe cover piece 146 has pipe slots 158 inset from side edges 154 and 152 for an inset width less than the predetermined tab length to receive tabs 156. The width of slots 158 are somewhat greater than that of the width of tab 156. Of course, slots 158 and tabs 156 could be symmetrically located on their respective covers 144 and 146 in a manner similar to that shown in FIG. 3. First semicircular top half 160 is connected to the bottom edge 150 of first pipe cover piece 144. Similarly, second top half 162 is connected to bottom edge 150 of second pipe cover piece 146. Together first and second top halves 160 and 162 cover generally circular top 140 of cylindrical container 134 when first 144 and second 146 pipe cover pieces are mated. Obverse side cover 164 depends from the semicircular perimeter of first top half 160 to cover a portion of the transparent arcuate side 138 of container 134. Similarly, reverse side cover 166 depends from the semicircular perimeter of second top half 162. Covers 164 and 166 each have top edge 168, bottom edge 170, first side edge 172 and second side edge 174. A joinder edge 176 joins said reverse side cover 166 to the obverse side cover 164 substantially along the entire length of first side edge 172. Towards the bottom edge 170 of the obverse side cover 164, a cover tab 178 extends the normal second side edge 174 margin for a predetermined tab length from the second side edge 174 along a tab width of second side edge 174. Cover slots 180 in reverse side cover 166 are inset from second side edge 174 for a distance less than the tab length and have a slot width greater than the tab width so that tab 178 may be received in slots 180. Viewing flap 182 defined by perforations 184 in at least one of the side covers 164 and 166 act as viewing means for allowing observation or the entry of light to the interior of container 134 in a manner similar to viewing flap 70. Of course, this viewing means function may be achieved by an interruption of first side edge 172 or allowing a slight gap between second side edge 174 of obverse side cover 164 and reverse side cover 166. The achievement of a viewing means is of course substantially identical to the achievement of an illuminating means for allowing the illumination of the interior of container 134.

FIG. 7 demonstrates an embodiment of shield 10 suitable for shielding cylindrical sight containers 134 of the type shown. This embodiment of shield 10 is similar to the embodiment of shield 10 shown in FIG. 4 since it is planar before use. Shield 186 shown in FIG. 7 can be thought of as a flattened shield 142 shown in FIGS. 5 and 6. Obverse side cover 164 and reverse side cover 166 are flattened into a single side cover 188 which has top 190, bottom 192, first 194 and second 196 side edges. First top half 160 and second top half 162 together become a plurality of pie shaped wedges 198. Each wedge 198 includes arcuate top edge 200 with two angled side edges 202 and a bottom edge 204. Bottom edge 204 of pie shaped wedges 198 are joined to top edge 190 of single side cover 188. The joinder between angled side edge 202 and bottom edge 204 of a first pie shaped wedge 198 may be connected to the joinder between side edge 202 and bottom edge 204 of second adjacent pie shaped wedge 198. First pipe cover piece 144 is joined to first pie shaped wedge 206 adjacent second side edge 196 of single side cover 188. Second pipe cover piece 146 is joined to second pie shaped wedge 208 adjacent first side edge 194 of single side cover 188. The connection between bottom edges 150 of pipe cover pieces 144 and 146 and arcuate top edges 200 should be kept to a minimum to avoid wrinkling, of course, the connection must be sufficient to preserve the joinder between wedges 206 and 208 and pipe cover pieces 144 and 146.

As those skilled in the art will readily recognize, some of the invention elements may be interchanged, for example those shown as integral may be separated or those separated may be made integral without adversely affecting the performance of the invention.

From the foregoing description it will be apparent that modifications can be made to the shield of the present invention without departing from the teaching of the invention. Also it will be appreciated that the invention has a number of advantages, some of which have been described above and others of which are inherent in the invention. Accordingly, the scope of the invention is only to be limited as is necessitated by the accompanying claims.

I claim:

1. An opaque dirt shield substantially covering transparent portions of a sight container comprising:
    an obverse cover generally conformal with the shape of the container having an upper edge and a lower edge and first and second lateral edges covering an obverse portion of transparent portions of said sight container;
    a reverse cover generally conformal with the shape of the container having an upper edge and a lower edge and first and second lateral edges substantially covering the remaining transparent portions of said sight container;
    first fastening means for securing one of said upper, lower, first and second lateral edge of said obverse cover to a corresponding one of said upper, lower, first and second lateral edge of said reverse cover;
    second fastening means for securing another one of said upper, lower, first and second lateral edge of said obverse cover to a corresponding one of said upper, lower, first and second lateral edge of said reverse cover;
    viewing means for visually inspecting the interior of said covers and said container; and
    said obverse cover and said reverse cover being freely rotatable on said container when said edges secured by said first and second fastening means are secured to each other.

2. The dirt shield of claim 1 wherein said viewing means is a viewing flap which is a partially detachable portion of at least one of said covers.

3. The dirt shield of claim 2 wherein said viewing flap is fully detachable.

4. The dirt shield of claim 3 further including illumination means for allowing illumination of the interiors of said covers and said sight container.

5. The dirt shield of claim 4 wherein said illumination means is an edge gap between adjacent edges of said obverse and reverse covers.

6. The dirt shield of claim 4 wherein said illumination means is an illumination flap which is a partially detachable portion of said cover.

7. The dirt shield of claim 6 wherein said illumination flap is fully detachable.

8. The dirt shield of claim 1 wherein said first fastening means are located near said first and said second lateral edges of each cover and are portions of each cover.

9. The dirt shield of claim 8 wherein said first fastening means are
    a slot between the first and second lateral edges inset an inset width from one edge and having a predetermined slot width;
    a tab extending the normal margin of an adjoining edge by a distance in excess of said inset width and having a width less than said slot width, said tab being received by said slot; and
    said slots and said tabs are located near said lower edge of each said cover.

10. The dirt shield of claim 9 wherein said viewing means comprise:
    a viewing flap which is partially detachable from said cover defined by perforating said cover, and including;
    illuminating means for allowing the illumination of the interior of said covers; and wherein
    said covers are fabricated from aluminum.

11. A dirt shield protecting a sight container connected by a input pipe to a reservoir, which container has a generally cylindrical body with a generally transparent arcuate side, said shield comprising:
    a first and second pipe cover piece which together are adapted to fit about the input pipe, each said pipe cover piece having top, bottom, and first and second side edges;
    a pipe tab extending the normal margin of one side edge of said first pipe cover piece having a predetermined tab length and tab width;
    a pipe slot in said second pipe cover piece having a slot width greater than the tab width, said slot insert from a side edge of said second pipe cover piece by an insert width which is less than the tab length, said slot receiving said tab;
    a first top connected to said first pipe cover piece at said bottom edge adapted to cover a portion of a top of said container;
    a second top connected to said second pipe cover piece at said bottom edge adapted to cover the remaining portion of said top of said container;
    an obverse cover adapted to fit about a portion of the transparent side of the container, said obverse cover having top, bottom, and first and second side edges, said top of said obverse cover being connected to said first top at a periphery of said first top;
    a reverse cover adapted to fit about the remaining portion of the transparent side of the container, said reverse cover having top, bottom, and first and second side edges, said top of said reverse cover being connected to said second top at a periphery of said second top; and
    a viewing flap on one of said obverse and reverse covers which is partially detachable therefrom.

12. The shield of claim 11 wherein said first and second pipe cover pieces, said pipe tab, said top, said obverse cover, and said reverse cover are integrally formed from heavy aluminum foil and said viewing flap is defined by perforations in said cover.

13. The shield of claim 12 wherein:
    said first and said second pipe cover pieces, said obverse cover, and said reverse cover are semi-cylindrical shells;
    said shield further including,
    a joinder hinge joining said first side edges of said reverse and obverse covers;
    a cover tab extending the normal margin of said second side edge of one of said obverse and said reverse covers having a predetermined tab length and tab width; and a cover slot in the other of said obverse and reverse cover having a slot width greater than the tab width, said slot inset from said second side edge of the other cover by an insert width which is less than the tab length, said slot receiving said tab.

14. A dirt shield protecting a sight container connected by a input pipe to a reservoir, which container has a generally cylindrical body with a generally transparent arcuate side, said shield comprising:

a first and second pipe cover piece which together are adapted to fit about the input pipe, each said pipe cover piece having top, bottom, and first and second side edges;

a pipe tab extending the normal margin of one side edge of said first pipe cover piece having a predetermined tab length and tab width;

a pipe slot in said second pipe cover piece having a slot width greater than the tab width, said slot insert from a side edge of said second pipe cover piece by an insert width which is less than the tab length, said slot receiving said tab;

a combined obverse cover and reverse cover combined into a single side cover having a top, bottom, and first and second side edges;

a plurality of pie shape wedges having an arcuate top edge and angled side edges, said wedges being joined to said top edge of said side cover at a bottom edge of said wedges, said wedges adapted to form a top to cover a portion of a top of said container;

said first pipe cover pieces is joined to one of said wedges adjacent one of said first and said second side edges;

said second pipe cover piece is joined to one of said wedges adjacent the other of said first and said second side edges; and said first and said second pipe cover pieces, said tab, said plurality of wedges and said side cover are planar before being fitted about said container and said pipe.

15. The shield of claim 14 further including illuminating means for allowing the illumination of the interior of said shield and said container.

16. A dirt shield protecting a sight container, which container has a generally transparent spherical side between a cylindrical top and a cylindrical bottom, said shield comprising:

a first top cover piece which is adapted to fit about a portion of the container top, said top cover piece having top, bottom, and first and second side edges;

a second top cover piece which is adapted to fit about the portion of the container top, said top cover piece having top, bottom, and first and second side edges;

an obverse cover adapted to fit about a portion of the transparent side of the container, said cover having top, bottom, and first and second side edges, said top of said obverse cover connected to said bottom of said first top cover piece;

a reverse cover adapted to substantially fit about the remaining portion of the transparent side of the container, said cover having top, bottom, and first and second side edges, said top of said reverse cover connected to said bottom of said second top cover piece;

a first bottom cover piece which is adapted to fit about a portion of the container bottom, said first bottom cover piece having top, bottom, and first and second side edges, said top of said first bottom cover piece connected to said bottom of said obverse cover;

a second bottom cover piece which is adapted to fit about the remaining portion of the container bottom, said second bottom cover piece having top, bottom, and first and second side edges, said top of said second bottom cover piece connected to said bottom of said reverse cover;

a bottom tab extending the normal margin of one side edge of said first bottom cover piece having a predetermined tab length and tab width;

a bottom slot in said second bottom cover piece having a slot width greater than the tab width, said slot inset from a side edge of said second bottom cover piece by an insert width which is less than the tab length, said slot receiving said tab; and a viewing flap on at least one of said obverse and reverse covers which is partially detachable therefrom.

17. The shield of claim 16 wherein said first and second top cover pieces, first and second bottom cover pieces, said bottom tab, said obverse cover, and said reverse cover are integrally formed from heavy aluminum foil and said viewing flap is defined by perforations in said cover.

18. The shield of claim 17 wherein:

said first and said second top cover pieces, and said first and said second bottom cover pieces are semicylindrical shells;

said obverse cover, and said reverse cover are semispherical shells;

said shield further including, a joinder hinge joining said first and said second top cover pieces; and illumination means for allowing the interior of said shield and said container to be illuminated.

19. An opaque dirt shield protecting a sight container, which container has a generally transparent spherical side between a cylindrical top, including a top cylindrical side surface and a circular top surface, and a cylindrical bottom including a bottom cylindrical side surface, said shield comprising:

a top cover including a top cylindrical band having an upper and a lower edge and a plurality of wedges joined to said upper edge, said band having a slot adjacent a slot longitudinal end and a tab adjacent an opposite tab longitudinal end, said tab adapted to be received in said slot to fasten said band about the top cylindrical side surface, each of said wedges having two angled side edges meeting in an apex, said wedges substantially covering said circular top surface after said band is wrapped about said top cylindrical side surface and said wedges are displaced into a plane intersecting said band at an angle of about ninety degrees, said top cover being substantially planar before it is placed on said cylindrical top;

a homolographic cover including a plurality of double wedges, each double wedge having arcuate sides terminating at truncated apexes at upper and lower double wedge ends, each double wedge joined to an adjacent double wedge near the joinder of adjacent double wedge sides, one upper double wedge apex being joined to said top cylindrical band, said homolographic cover substantially adapted to conform to and cover said spherical side and being substantially planar before it is placed on said spherical side;

a bottom cover including a bottom cylindrical band having an upper and a lower edge joined to one lower double wedge apex, said band having a slot adjacent a slot longitudinal end and a tab adjacent an opposite tab longitudinal end, said tab adapted to be received in said slot to fasten said band about the bottom cylindrical side surface, said bottom cover being substantially planar before it is placed on said cylindrical bottom; and viewing means for visually inspecting the interior of said covers and said container.

* * * * *